US012168361B2

(12) United States Patent
Kollata et al.

(10) Patent No.: US 12,168,361 B2
(45) Date of Patent: Dec. 17, 2024

(54) TEST SUBSTRATE FOR INKJET PRINTER DROP PLACEMENT ANALYZER

(71) Applicant: Kateeva, Inc., Newark, CA (US)

(72) Inventors: Eashwer Chandra Vidhya Sagar Kollata, Fremont, CA (US); Gregory Lewis, Mountain View, CA (US); James Kundrat, Newark, CA (US); Alexander Sou-Kang Ko, Santa Clara, CA (US)

(73) Assignee: Kateeva, Inc., Newark, CA (US)

( * ) Notice: Subject to any disclaimer, the term of this patent is extended or adjusted under 35 U.S.C. 154(b) by 40 days.

(21) Appl. No.: 17/821,570

(22) Filed: Aug. 23, 2022

(65) Prior Publication Data

US 2023/0064743 A1 Mar. 2, 2023

Related U.S. Application Data

(60) Provisional application No. 63/263,721, filed on Nov. 8, 2021, provisional application No. 63/260,656, filed on Aug. 27, 2021.

(51) Int. Cl.

| | |
|---|---|
| ***B41J 2/045*** | (2006.01) |
| ***B41J 29/393*** | (2006.01) |
| ***B41M 5/50*** | (2006.01) |
| ***B41M 5/52*** | (2006.01) |

(52) U.S. Cl.
CPC .......... *B41M 5/5218* (2013.01); *B41M 5/504* (2013.01); *B41M 5/508* (2013.01); *B41M 2205/10* (2013.01); *B41M 2205/16* (2013.01)

(58) Field of Classification Search
CPC .... B41J 2/0456; B41J 29/393; B41M 5/5218; B41M 5/504; B41M 5/508
See application file for complete search history.

(56) References Cited

U.S. PATENT DOCUMENTS

| | | | | |
|---|---|---|---|---|
| 6,399,207 | B2 * | 6/2002 | Sharma | C09D 101/14 428/323 |
| 7,807,240 | B2 | 10/2010 | Francis et al. | |
| 8,191,979 | B2 * | 6/2012 | Matsumoto | B41J 11/06 347/101 |
| 2002/0167268 | A1 | 11/2002 | Aruga et al. | |
| 2007/0188535 | A1 | 10/2007 | Elwakil et al. | |
| 2009/0068360 | A1 * | 3/2009 | Shimada | B41M 5/504 427/256 |
| 2016/0369104 | A1 | 12/2016 | Gu et al. | |
| 2017/0219741 | A1 * | 8/2017 | Frey | G02B 1/116 |
| 2019/0010349 | A1 * | 1/2019 | Shimono | C09D 11/322 |

OTHER PUBLICATIONS

International Search Report and Written Opinion issued Jan. 23, 2023 for International Application No. PCT/US2022/075339.
Mikkonen et al., "Inkjet Printable Polydimethylsiloxane for All-Inkjet-Printed Multilayered Soft Electrical Applications", ACS Applied Materials Interfaces, Dec. 2020, 11990-11997.

* cited by examiner

*Primary Examiner* — Jason S Uhlenhake
(74) *Attorney, Agent, or Firm* — Hauptman Ham, LLP

(57) ABSTRACT

A substrate for an inkjet printer is described herein. The substrate comprises a material selected to provide high contrast reflected light and having a print material receiving surface with a neutral response to the print material.

22 Claims, 4 Drawing Sheets

TEST SUBSTRATE FOR INKJET PRINTER DROP PLACEMENT ANALYZER

CROSS-REFERENCE TO RELATED APPLICATIONS

This patent application claims benefit of U.S. Provisional Patent Application Ser. No. 63/260,656 filed Aug. 27, 2021, and U.S. Provisional Patent Application Ser. No. 63/263,721 filed Nov. 8, 2021, each of which is entirely incorporated herein by reference.

FIELD

This patent application concerns inkjet printing, units for analyzing accuracy of drop placement for inkjet printers, and substrate for such test units.

BACKGROUND

Industrial inkjet printers are used to apply materials to large substrates to form devices of all kinds. The substrates can be rigid or flexible, thick or thin, and can be made of an array of materials. The most common types of substrates used in this way are substrates made of various types of glass, which are processed to make electronic displays such as televisions and displays for smart phones.

An inkjet printer uses a printhead with nozzles that dispense a print material for deposition onto a substrate. Today's industrial inkjet printers deposit very small droplets of print material with extremely high accuracy to form very small, or very thin, precisely located structures on the substrate. To ensure accurate placement of droplets on the substrate, operating characteristics of each nozzle, and changes thereto, must be known at all times. For this reason, a number of diagnostic modules are typically used to measure and track performance of the nozzles.

One such diagnostic modules is a drop placement test system. The drop placement test system is used to test where drops land when dispensed by a nozzle of an inkjet printer, and can also be used to test the size of the placed drop on the substrate. Such data can be stored so that a print plan can be formed based on the ascertained performance of print nozzles. Typically, drops from all nozzles of the printer are deposited onto a test substrate of the drop placement test system, and then the drops are photographed to determine where they landed and how big they are.

An industrial scale inkjet printer can have hundreds of thousands of print nozzles, each configured to form very small drops, for example having diameter of 5-10 μm. To understand the performance of all the nozzles, it is useful to deposit at least one drop from each nozzle on the test substrate and photograph the drop. Where a test substrate does not have sufficient area to accommodate drops from all the nozzles, a first test can be conducted using a first subset of the nozzles and a first test substrate, or portion of a test substrate. Then, a second test substrate or portion of the test substrate is readied, and a second test is conducted using a second subset of the nozzles. This process is repeated until all the nozzles are tested. Minimizing the number of cycles maximizes the speed of determining the print plan, and formulating a test substrate to have desired properties when testing drops can be part of maximizing speed of determining the print plan and thus throughput for the inkjet printing system. Thus, there is a need for test substrates, and drop placement test systems, that maximize throughput and speed of drop placement testing.

SUMMARY

Embodiments described herein provide a substrate for an inkjet printer, the substrate comprising a material selected to provide high contrast reflected light and having a print material receiving surface with a neutral response to the print material.

Other embodiments described herein provide a drop placement test system for analyzing drops of a print material, the drop placement test system comprising a test substrate system comprising a stage for a test substrate, the test substrate being a flexible substrate comprising a material selected to provide high contrast reflected light, the substrate having a print material receiving surface with a neutral response to the print material, the print material receiving surface comprising a transparent film, and a backing layer adhered to the transparent film; and an imaging apparatus with a light source disposed to illuminate the print material receiving surface using light matched to optical properties of the backing layer and a detector for capturing an image of light reflected from the test substrate.

Other embodiments described herein provide a method, comprising dispensing a plurality of drops of a print material from nozzles of a printhead of an inkjet printer onto a test substrate, the test substrate comprising a material selected to provide high contrast reflected light and having a print material receiving surface with a neutral response to the print material upon contact; imaging the drops using light matched to the material of the test substrate to be reflected by the test substrate with high contrast from light reflected by the drops; and collecting the test substrate using a roll.

DETAILED DESCRIPTION

Figure 1:
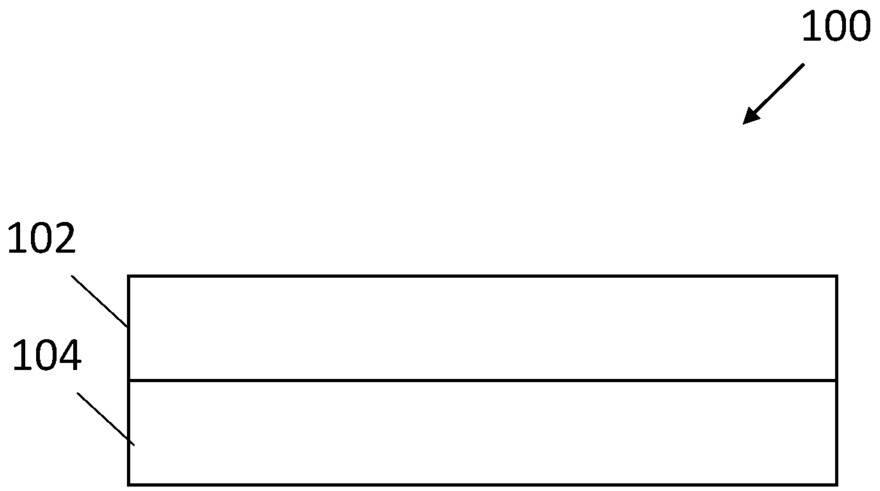
FIG. 1 is an elevation view of a test substrate according to one embodiment.

A test substrate for testing deposition of print material from an inkjet printer is described herein. The test substrate provides a compatible surface for receiving the print material, such that behavior of the print material when deposited on the test substrate can be related to behavior of the print material when deposited on a non-test substrate. For example, the test substrate may be configured such that change in drop width when a drop of print material is deposited on the test substrate is similar to change in drop width when a drop of print material is deposited on a non-test substrate. In some cases, the test substrate is configured such that drops of print material are immobilized upon contact with the test substrate. For example, if behavior of a drop deposited on a production substrate is known, such as with respect to spreading or other reaction, it may be desirable to ascertain the exact size of a drop dispensed by a nozzle of the printer. The known spreading behavior can be applied to the exact size of the drop to understand the result of depositing a drop from the nozzle onto the production substrate. In such cases, a test substrate with a print material receiving surface that immobilizes the drop upon contact may be useful in determining the exact size of the drop.

Droplets placed on a test substrate can also be used to assess how a nozzle places a droplet on a substrate. The location of the nozzle, when ejecting a droplet, is known or ascertained, and the location of the droplet on the substrate is ascertained. The two locations are compared to define how the nozzle places a droplet on a substrate. Alternately, an expected location of a droplet on a test substrate, based on assumed performance of the ejecting nozzle, is compared with actual location of the dispensed droplet to determine an adjustment. Droplet size information and droplet placement information can be used to control ejection of droplets from the nozzle to achieve precise droplet size and placement on a substrate.

The test substrate also interacts with light to provide high contrast reflected light for optimal imaging of drops deposited on the test substrate. The optical properties of the test substrate are generally matched to the light to be used for imaging such that micron-scale details of the droplets can be resolved by an imaging system.

The test substrates described herein are configured for imaging the side of the substrate that receives the drops. Thus, the drops are placed on the print material receiving surface, and the substrate is positioned with the print material receiving surface facing an imaging unit to capture an image of the drops. The test substrate may be a tape-like or ribbon-like structure that is passed through a test zone where the drops are placed and then through an imaging zone where images of the drops are captured. For optimal imaging, the test substrate generally comprises a material selected to provide high contrast reflected light. The material may be homogeneous, or the test substrate may have a layered structure. Depending on the type of material being imaged, the material may include a pigment to reflect desired frequencies of light selected to provide optimal imaging of drops of the print material. For example, where the print material is clear or transparent, with no color, the material of the test substrate may include a reflective material so the drops can be imaged using refractive properties of the drops. Where the print material has a color, such as black, white, or red, the material of the test substrate may have a black or white color, or another color selected to provide high contrast with the drops of print material.

The print material receiving surface may be a surface of the test substrate that has a surface treatment. For example, a chemical composition may be applied to the surface of the test substrate to provide a neutral response to the print material upon contact. In general, the properties of the print material receiving surface are selected to provide neutral response to the print material upon contact, and to have optical properties that support clear, sharp imaging of the drops at very high resolution or magnification, for example as high as 400 nm per pixel. The other materials of the test substrate are likewise chosen for optical properties that support clear, sharp imaging, and the light used is also selected to interact with the optical properties of the test substrate and the drops themselves to provide clear, sharp, high resolution images of the drops.

Here, "neutral response" means that a drop does not substantially change shape or composition upon contact with the print material receiving surface. The drop adopts a contact angle, with the print material receiving surface, that is around 90 degrees. In some cases, the drop may spread a little upon contact with the print material receiving surface, but the surface material is chosen such that the contact angle of the drop with the surface is no less than about 75 degrees.

Contact angle can be measured according to the ASTM-D7334 standard practice for contact angle. At the time of this writing, D7334 is on version 8, issued in 2013. D7334 is a standard practice for contact angle that refers to standard contact angle measurement method D5725, which was withdrawn by ASTM in 2010 by reference to TAPPI contact angle test method T 458 cm-14 published in 2009. Any of these methods can be used to measure contact angle.

In some cases, the print material receiving surface may be a material that is coated onto the test substrate. In other cases, the print material receiving surface may be a surface of a film that is opaque, translucent, pigmented, and/or reflective. In some cases, the test substrate may be a reflective material, for example a metal film or foil, with a surface treatment to provide a print material receiving surface that has a neutral response to the print material upon contact that is uniform across the print material receiving surface. In general, where imaging is done from the print material receiving surface side of the test substrate, the test substrate is configure to hide sufficient structures behind the test substrate so as not to corrupt the captured images. In that sense, the test substrate may be opaque or otherwise non-transmissive, or minimally transmissive, to light such that no features of the imaging surface behind the test substrate are resolved in the images.

The test substrates are generally thin to support rolling around a spool so that successive printing and imaging cycles can be performed using one test substrate of extended length. The test substrate are also generally thin enough to have flexibility to be securely held against a flat surface for printing and for imaging. Typically, the test substrate is chucked to a vacuum surface for printing and imaging, and the test substrates herein are thin enough to be flattened to such a vacuum surface using a nominal pressure difference. An example thickness for the test substrates herein is 50 μm to 100 μm, or around 2 mils to 4 mils.

The print material receiving surface is generally a low surface energy material, such as a biaxially oriented polymeric material, where the material to be deposited on the print material receiving surface is a hydrophobic material. Suitable materials will have surface energy less than about 35 dynes/cm, for example from about 20-30 dynes/cm, such as 21-26 dynes/cm, for example 21-23 dynes/cm. In one case, a print material receiving surface has a surface energy of 22 dynes/cm. Examples of such materials include polyethylene (PE), polypropylene (PP), and other polyolefin materials (PO), polyethylene terephthalate (PET) and other polyester materials, and silicone-based (polysiloxane-based) materials, such as polydimethylsiloxane (PDMS). Fluorinated polymers, such as polytetrafluoroethylene (PTFE), polytrifluoroethylene (P3Fet or PTrFE), polyvinylidene fluoride (PVDF), polyvinyl fluoride (PVF), polyhexafluoropropylene (PHFP), fluorinated ethylene polymer (FEP), and polychlorotrifluoroethylene (CTFE), can be used. Other polymers such as styrene-butadiene rubber (SBR), natural latex rubber, and polyisobutylene (PIB) can also be used. The print material receiving surface can be a compounded PE material, a compounded PP material, a compounded PET material, a compounded or uncompounded ("pure") silicone material, or a mixture, copolymer, or multipolymer thereof. Hydrophobic self-assembling monolayer (SAM) materials, such as PDMS, methyl-terminated organosilanes, and fluoroalkylsilanes, can be used to form coatings suitable for use as print material receiving surfaces for the test substrate described herein. In one example, the print material receiving surface is a silicone-based film or coating.

In some cases, the print material receiving surface may be made of an environmentally stable material that does not change substantially from exposure to ambient conditions such as normal atmosphere, room temperature, and ambient light. Specifically, any change in the surface energy of the print material receiving surface upon exposure to ambient conditions should be slow to occur. For example, a material whose surface energy changes less than about 1 dyne/cm/hr is usable for the print material receiving surface, so long as the test substrate is not exposed to ambient conditions for more than about 24 hours. More stable materials, for example materials with surface energy change no more than about 5 dynes/cm/day, give better results, and those with change no more than about 1 dyne/cm/day give even better results.

As noted above, a test substrate can have a layered structure. FIG. 1 is an elevation view of a test substrate 100 according to one embodiment. The test substrate 100 has a print material receiving surface 102 and a backing layer 104. The test substrate 100 is, thus, a bilayer substrate. The print material receiving surface 102 is made of a material that has a neutral response to the print material to be deposited thereon. Here, "neutral response" means that a drop of print material brought to rest on the print material receiving surface does not substantially flow, move, or change shape or composition. In one aspect, the drop adopts a contact angle in the vicinity of 90 degrees with the print material receiving surface, for example not less than about 75 degrees. In another aspect, the drop adopts a contact angle not more than about 105 degrees. Where the print material is a hydrophobic material, using a print material receiving surface that has low surface energy, as described above, results in the described neutral response.

The contact angle the drop adopts upon deposition is related to the spreading behavior of the drop. In production inkjet printing, it may be desired to deposit drops of print material onto a substrate and have the drops spread and coalesce to form a film without gaps. In such cases, the drops are deposited with a maximum pitch selected such that the spreading of the drops will result in formation of a film without gaps. The film thus formed has a minimum thickness, which is the minimum thickness a film can be formed without gaps on the substrate using the particular print material. A pitch less than the maximum pitch can be used to form a film thicker than the minimum thickness, if desired.

Drops that spread upon deposition form a contact angle with the substrate surface that is generally less than 90 degrees, measured as the angle between the substrate surface and a line tangent to the drop surface at the contact edge between the drop and the substrate surface. Lower contact angle is generally associated with more dot gain. If the spreading behavior of the drop on the substrate surface is known, i.e. if the drop size gain factor on the substrate surface is known, it may be desired to known the exact size of drops dispensed by a print nozzle of the inkjet printer so that the drop size on the substrate can be predicted. In such cases, the print material receiving surface of the test substrate may be configured to have a neutral response to the print material so the size of the drop is unaffected by drop interaction with the print material receiving surface. In other aspects, maximizing the number of drops that can be crowded onto a test substrate for one measurement cycle can maximize substrate throughput.

The print material receiving surface may be transparent, partially transparent, translucent, partially opaque, or opaque. Where the print material is mostly made of organic materials that are substantially immiscible with water, the print material receiving substrate may be hydrophobic. The choice of materials for the print material receiving surface to have a neutral response to the print material depends on the print material to be deposited. For example, where a print material has a high proportion of acrylate monomers, the print material receiving surface may be made of a silicone-based material.

The backing layer can be a film of a polymeric material or a metal film or foil that is adhered to the material that provides the print material receiving surface. Thus, two films can be adhered to form the test substrate, or the backing layer can be applied as a coating on the print material receiving film, or print material receiving material can be applied to a backing film or foil and solidified. The backing layer may be a polymeric material or a metal material that is not in the form or a film or foil, but that can be applied to a film for receiving print material drops by spraying, plasma deposition, CVD, evaporative deposition, or other suitable deposition method. Such methods can also be used to apply a print material receiving material to a backing layer. Such materials can also be applied by inkjet printing. In other words, a test substrate for an inkjet printer can be fabricated using an inkjet printer.

Where a backing layer is used, the backing layer is generally a light-blocking layer or light-absorbing layer that reduces or substantially eliminates light transmission through the test substrate. The backing layer may be opaque, partially opaque, or translucent, and is generally used to reduce background optical noise to improve imaging of print materials deposited on the print material receiving surface.

Metals such as aluminum, silver, chromium, and the like can be applied to a polymeric film to provide a reflective backdrop for imaging print material deposited on the polymeric film. The metal can be sputtered onto the polymeric film, plasma sprayed onto the polymeric film, or deposited on the polymeric film using an evaporative deposition process. The thickness of the metal is generally selected to reduce transmission of light through the backing layer, which in turn reduces noise captured when an image of deposited print material is captured by an imaging device. The metal may be thick enough to be substantially opaque (e.g. optical density 2.5 or higher, where optical density is defined as logarithm of optical intensity of incident light divided by optical intensity of transmitted light). Alternately, the metal may be thick enough to reduce light transmission to a level that allows a sufficiently clean image of deposited print material to be captured. Such a backing layer may be regarded as translucent, and may have optical density as low as 1 (i.e. "90% opaque" or 10% "transmissive"). For aluminum, a thickness of 120 nm is generally opaque, but in some cases a thickness as low as 50 nm could be used effectively. In general, thickness of the metal layer is at least about 50 nm, such as at least about 100 nm, for example at least about 120 nm. Higher thicknesses, for example 500 nm, can be used with little additional benefit, but at the potential cost of higher film stiffness. A mylar-type material can be used as a test substrate.

The test substrate, overall, has light transmission, in relevant wavelengths, less than 80%, for optical density greater than about 0.1. The lower the light transmission (the higher the optical density) the better the result when the test substrate is used for imaging. For example, better results are obtained at transmission less than 10%, optical density greater than about 1, and even better at transmission less than about 0.001%, optical density greater than about 5. The optical density of the test substrate may be entirely due to the backing layer, entirely due to the print material receiving surface, or due to the combined properties of the two layers. Adhesive layers, and other layers, can also contribute to the optical properties, such as optical density, of the test substrate. It should be noted that imaging of droplets on a test substrate, as described herein, can be performed using visible light or non-visible light, such as ultraviolet or infrared light. A test substrate is configured to provide high contrast reflected light in the wavelength or spectral range used for imaging. Thus, the combination of print material receiving surface, backing layer, and other layers, are selected to reflect and absorb light of specific wavelengths or ranges such that the light reflected from the test substrate and droplets in the imaging wavelength range has high contrast. That is, light reflected from the droplets, in the imaging wavelength range, is much brighter (more intense, higher power density) than light reflected from the area of the test substrate around the droplets. Contrast levels of 60%, 80% or 90% provide increasingly good results for imaging droplets.

For example, in one case imaging drops on a test substrate can be performed where light reflected from the drops is minimized and light reflected from the test substrate is maximized. In such an example, contrast between the light areas and dark areas greater than 60% can be helpful to maximize accuracy of imaging. Contrast, in this case, can be computed from greyscale values of a digital image, where white pixels have greyscale values of 256 and black pixels have greyscale value of 0. Contrast is then computed as (bright value−dark value)/256. So, if white areas have greyscale value of 256, contrast of 60% is found where dark values are 100 or less. Higher contrast is better in these cases. Lower contrast can, of course, be used, but accuracy of imaging declines.

Figure 2:
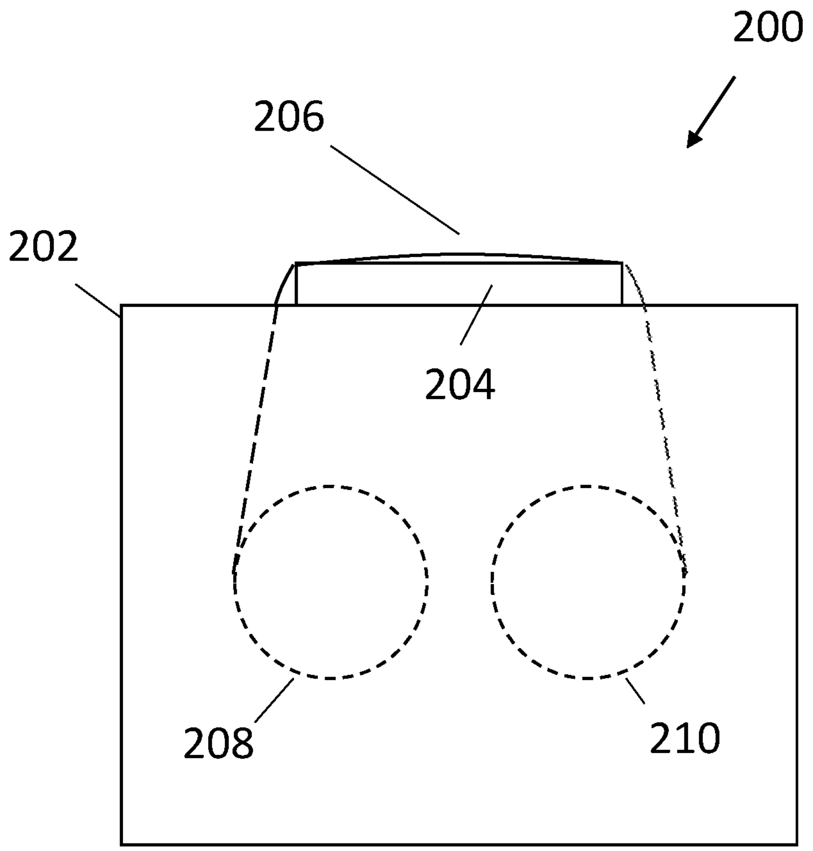
FIG. 2 is an elevation view of a drop placement test system according to one embodiment.

FIG. 2 is an elevation view of a drop placement test apparatus 200 according to one embodiment. The drop placement test apparatus 200 uses the test substrate described herein. A housing 202 supports the functions of the drop placement test apparatus 200. The housing 202 has a stage 204 for positioning a test substrate 206 to receive print material and to be imaged. The test substrate 206 is any of the test substrate described herein. The test substrate is provided on a supply roll 208 that is unspooled within the housing 202, routed to the stage 204 for printing and imaging, and then collected on a take-up roll 210 after use. When the last length of the test substrate is used, the supply roll and the take-up roll are swapped, and a new supply roll of test substrate installed.

The stage 204 generally uses a mechanism to secure the test substrate. In many cases, the mechanism is a vacuum application at the surface of the stage 204. The test substrate 206, as mentioned above, is thin enough to have flexibility to respond to application of vacuum by adhering to the stage 204. Test substrates that are too thick cross the stage 204 with clearance that is too high to be closed by application of vacuum. The test substrate does not "chuck" properly. Test substrate having the thickness described herein generally cross the stage 204, where the stage has suitable width, with small clearance of about 2 mm or less so that application of vacuum will secure the test substrate 206 to the stage 204. Upon release of vacuum, the test substrate 206 generally disengages with the stage 204. In some cases, the drop placement test apparatus 200 may be configured to apply positive pressure at the stage to disengage the test substrate 206 from the stage 204.

The test substrate 206 is secured to the stage 204 during printing and during imaging. After imaging, the test substrate 206 is disengaged from the stage 204, and the supply roll 208 and take-up roll 210 are rotated to advance the test substrate 206 such that an unused area of the test substrate 206 is positioned on the stage 204. In some cases, the housing 202 may include tensioning devices to maintain clearance of the test substrate 206 above the stage 204 for vacuum chucking. The housing 202 may also include a processing unit (not shown) to solidify droplets printed on the test substrate 206 before rolling the used portions thereof onto the take-up roll 210.

The stage 204 is shown here schematically. The edges of the stage 204 may be beveled to provide smooth landing surfaces for the test substrate 206 on the stage 204. Guide rollers can also be used to reduce the impingement angle of the test substrate 206 on the stage 204, to reduce bending and contact pressure on the test substrate 206 and potentially to reduce clearance between the test substrate 206 and the stage 204 when the test substrate 206 is not adhered to the stage 204.

The materials of the test substrate are also generally selected for ease of use with the drop placement test apparatus. For example, the materials are generally chosen such that the test substrate does not adhere to itself substantially while rolled on the supply roll. The materials are also generally selected to endure handling without deforming, scuffing, or degrading, and layered materials are selected to avoid any delamination. Optically compatible adhesives, such as Canada balsam, and optically passive or optically neutral pressure sensitive adhesives and curable (UV, thermal, etc.) adhesives can be used to adhere layers in an optically non-intrusive manner.

Figure 3:
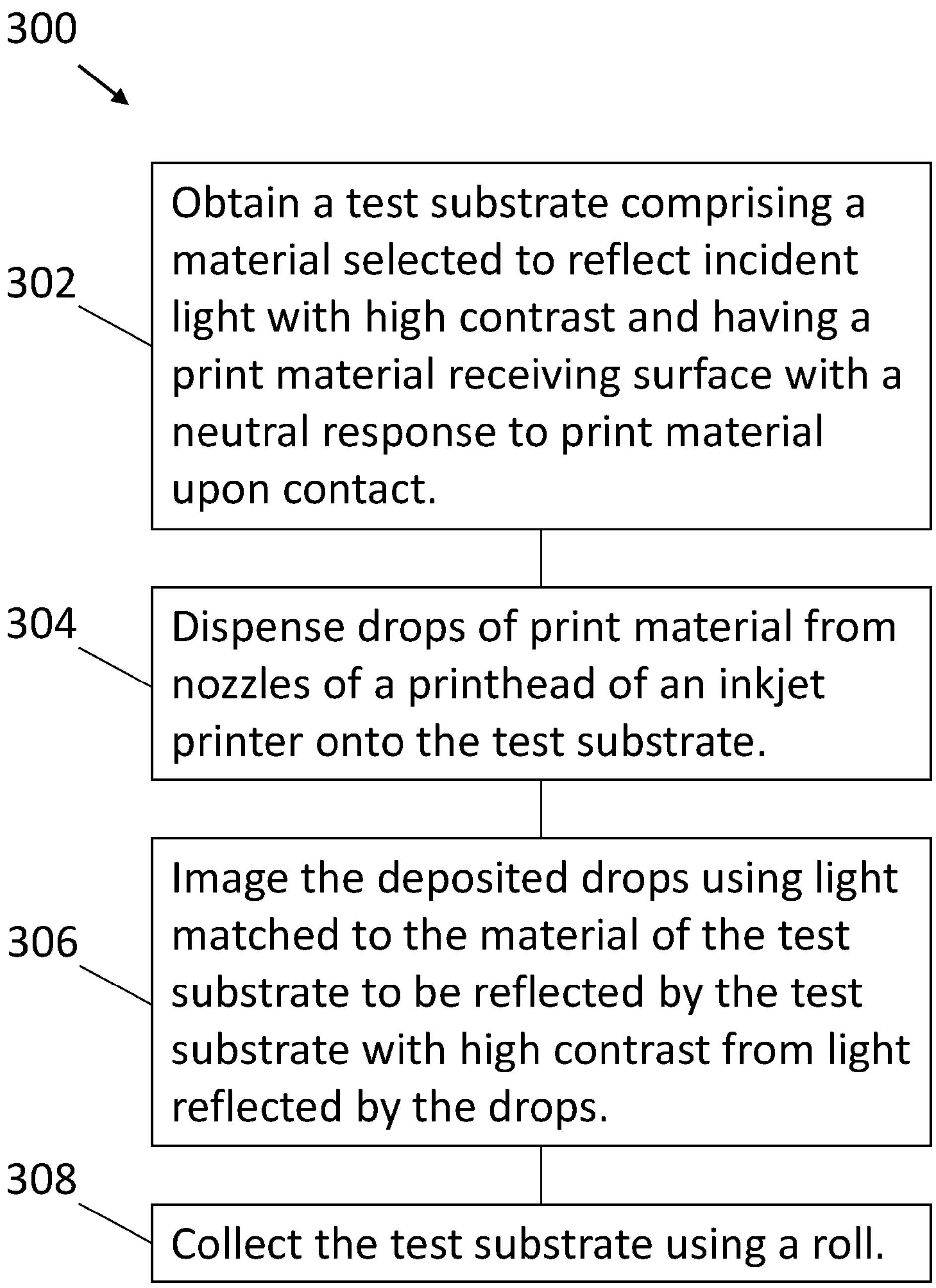
FIG. 3 is a flow diagram summarizing a method according to one embodiment.

FIG. 3 is a flow diagram summarizing a method 300 according to one embodiment. At 302, a test substrate comprising a material selected to reflect incident light with high contrast and having a print material receiving surface with a neutral response to print material upon contact is obtained. The test substrate can be any of the test substrates described herein, and is selected to support imaging of a particular print material using light that is also selected based on the test substrate and the print material.

At 304, drops of print material are dispensed from nozzles of a printhead of an inkjet printer onto the test substrate. The drops may be as small as 10 pL, and the materials of the test substrate are generally selected such that the drop does not substantially change shape or composition upon contact with the print material receiving surface of the test substrate. The drop typically adopts a contact angle of about 90 degrees upon contact with the print material receiving surface, but in any event the contact angle is not less than about 75 degrees so that the number of drops deposited on the test substrate can be maximized.

At 306, the deposited drops are imaged using light matched to the material of the test substrate to be reflected by the test substrate with high contrast from light reflected by the drops. The images may be photographic images collected by a camera or CCD imager, or the images may be intensity images or other kinds of images that can be captured using line scanners or photosensor arrays configure to provide sharp, clear images at resolutions up to 400 nm per pixel so that drop characteristics can be resolved from the images.

At 308, the test substrate is advanced and collected using a roll. The test substrates herein combine rollability with the imaging and drop interaction characteristics described above. In some cases, the test substrate has a print material receiving surface that immobilizes print material drops upon contact.

Figure 4A:
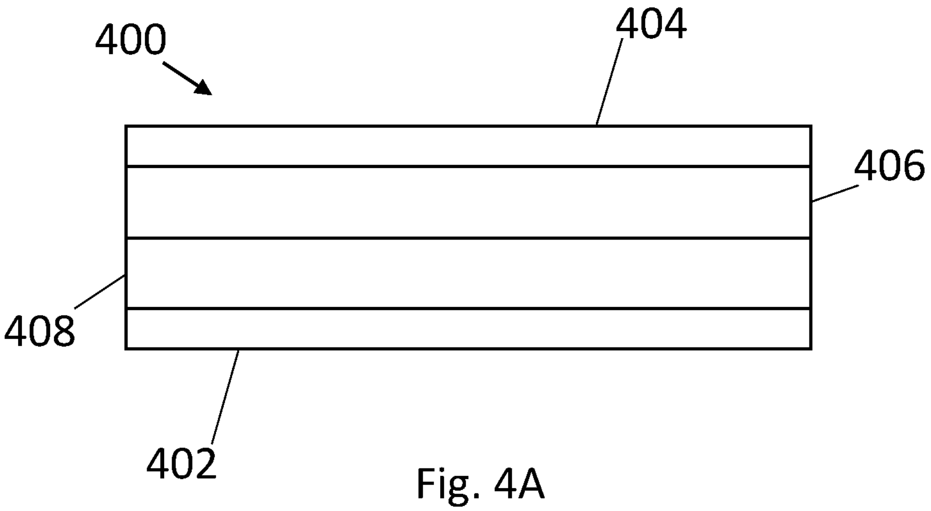
FIG. 4A is an elevation view of a test substrate according to another embodiment.

In some cases, a multi-layer test substrate can be used. FIG. 4A is an elevation view of a test substrate 400 according to another embodiment. The test substrate 400 has a backing layer 402, a print material receiving surface 404, a print material receiving surface support layer 406 that contacts the print material receiving surface 404 and is disposed between the backing layer 402 and the print material receiving surface 404, and an adhesive layer 408 between the backing layer 402 and the print material receiving surface support layer 406. In this case, the layer 406 provides structural strength to the test substrate 400 to optimize handling of the test substrate in a drop placement analyzer such as the apparatus 200. The print material receiving surface 404 is substantially as described above, and is a thin coating of a material selected to have a neutral response to print material deposited thereon. The print material receiving surface support layer 406 may be any flexible material, and is generally polymeric such as a polyolefin material (PE, PP) or a PET material. The adhesive layer 408 is applied to a thickness selected to provide strong adhesion without impacting imaging of print materials. In general the thickness of a test substrate described above can be less than about 50 μm, and thickness of the print material receiving surface 404 combined with the backing layer 402 can be 10 μm or less. In one example, the print material receiving surface support layer 406 is 23-25 μm thick and the adhesive layer 408 is about 15-18 μm thick.

Figure 4B:
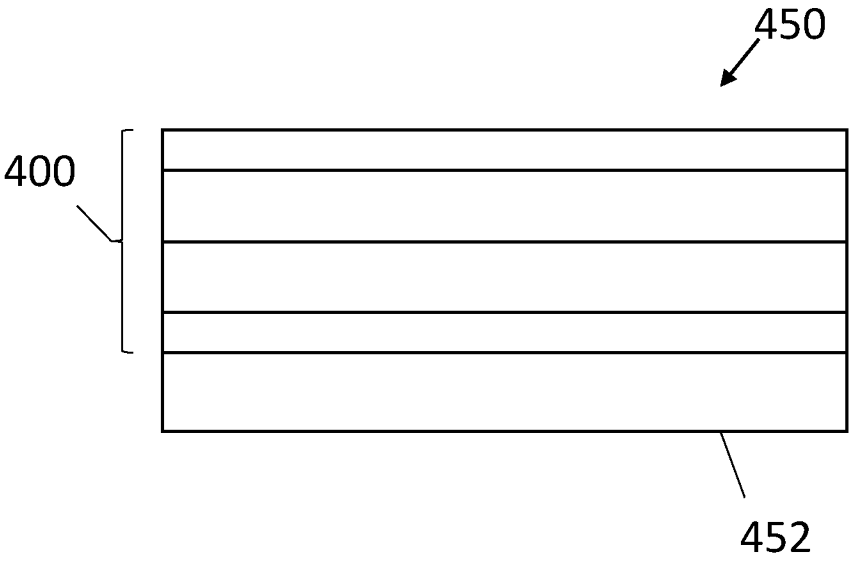
FIG. 4B is an elevation view of a test substrate according to another embodiment.

FIG. 4B is an elevation view of a test substrate 450 according to another embodiment. The test substrate 450 includes, as a component, the test substrate 400, but adds a further back structure 452, which can be one or more layers. In this case, the back structure 452 is one layer, which is a transparent polymeric material. The back structure can be transparent, partially transparent, translucent, partially opaque, or opaque, and may be selected to reduce light transmission through the test substrate 450. For example, the back structure 452 can have a first optical density and the backing layer 402 can have a second optical density, where the total optical density of the backing layer 402 and the back structure 452 is a function of the first optical density and the second optical density. Using a back structure such as the back structure 452 may allow use of a thinner backing layer 402, which can have benefits in cost and physical properties of the test substrate 450. In one case, the backing layer is a metal layer, as described above, and the back structure 452 is a transparent polymer film, such as PET.

It should be noted that other materials can be used as light-blocking materials. For example, a paint layer can be coated onto a film that provides a print material receiving surface. The paint layer can serve as a backing layer to block, or reduce transmission of, light through the test substrate. In other cases, the paint layer can serve as a back structure, and can be coated onto the back of a backing layer (which can be metal or another material). The paint layer can be opaque, partially opaque, or translucent, can be white, black, or any color to block light in a desired way, and can be coated onto any component of a test substrate by spraying, slot die coating, ribbon coating, or coextrusion. In other cases, pigment can be added to the various polymeric layers described above to reduce light transmission through the test substrate. For example, in some cases, the back structure can be a pigmented polymeric material, such as white or black PET. Black colored materials can help provide high contrast reflected light by absorbing incident light. While colored materials can help provide high contrast reflected light by dispersing contrast-reducing incident light.

While the foregoing is directed to embodiments of one or more inventions, other embodiments of such inventions not specifically described in the present disclosure may be devised without departing from the basic scope thereof, which is determined by the claims that follow.

The invention claimed is:

1. A substrate for an inkjet printer, the substrate comprising a material selected to provide high contrast reflected light and having a print material receiving surface with a neutral response to the print material, a reflective backing layer, and a print material receiving surface support layer disposed between the print material receiving surface and the backing layer.

2. The substrate of claim 1, wherein the substrate is opaque.

3. The substrate of claim 1, wherein the print material has a contact angle no less than about 75 degrees with the print material receiving surface.

4. The substrate of claim 1, wherein the print material receiving surface is a transparent film applied to a reflective backing layer.

5. The substrate of claim 1, having a thickness no more than about 150 μm.

6. The substrate of claim 1, wherein the print material receiving surface is made of an environmentally stable material.

7. The substrate of claim 1, wherein the print material receiving surface is a transparent coating.

8. The substrate of claim 7, wherein the backing layer comprises a metallic film.

9. The substrate of claim 8, wherein the print material receiving surface is a hydrophobic polymeric material.

10. The substrate of claim 1, wherein the print material receiving surface is a polymeric material layer, and the polymeric material layer is adhered to a metallic backing layer coated onto the print material receiving surface.

11. The substrate of claim 1, further comprising a pigment.

12. A drop placement test system for analyzing drops of a print material, the drop placement test system comprising:

a test substrate system comprising a stage for a test substrate, the test substrate being a flexible substrate comprising a material selected to provide high contrast reflected light, the substrate having a print material receiving surface with a neutral response to the print material, the print material receiving surface comprising a transparent film, backing layer, and a print material receiving surface support layer disposed between the print material receiving surface and the backing layer; and an imaging apparatus with a light source disposed to illuminate the print material receiving surface using light matched to optical properties of the backing layer and a detector for capturing an image of light reflected from the test substrate.

13. The drop placement test system of claim 12, wherein the stage is coupled to a vacuum source for securely holding the test substrate against the stage in a flat orientation.

14. The drop placement test system of claim 12, wherein the print material has a contact angle no less than about 75 degrees with the print material receiving surface.

15. The drop placement test system of claim 14, wherein the print material receiving surface is made of an environmentally stable material.

16. The drop placement test system of claim 12, wherein the backing layer is a reflective film.

17. The drop placement test system of claim 12, wherein the transparent film is a hydrophobic film and the backing layer is a metallic coating on the hydrophobic film.

18. The drop placement test system of claim 12, wherein the print material receiving surface comprises a surface treatment on the test substrate.

19. The drop placement test system of claim 12, wherein the light is also matched to optical properties of the print material and the print material receiving surface such that the light reflected from the test substrate provides a clear image of drops of print material placed on the print material receiving surface.

20. A method, comprising:

dispensing a plurality of drops of a print material from nozzles of a printhead of an inkjet printer onto a test substrate, the test substrate comprising a material selected to provide high contrast reflected light and having a print material receiving surface with a neutral response to the print material upon contact;

imaging the drops using light matched to the material of the test substrate to be reflected by the test substrate with high contrast from light reflected by the drops; and collecting the test substrate using a roll.

21. The method of claim 20, wherein the print material has a contact angle of no more than about 75 degrees with the print receiving material.

22. The method of claim 20, wherein the test substrate comprises a backing layer, the print material receiving surface is a transparent material, and the backing layer is a reflective material.

* * * * *